(12) United States Patent
Bostick et al.

(10) Patent No.: US 9,207,933 B2
(45) Date of Patent: Dec. 8, 2015

(54) IDENTIFYING AUTHORS OF CHANGES BETWEEN MULTIPLE VERSIONS OF A FILE

(75) Inventors: James E. Bostick, Cedar Park, TX (US); Randolph M. Forlenza, Austin, TX (US); Daniel Tam, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1874 days.

(21) Appl. No.: 11/548,092

(22) Filed: Oct. 10, 2006

(65) Prior Publication Data

US 2008/0086718 A1 Apr. 10, 2008

(51) Int. Cl.
*G06F 9/44* (2006.01)
(52) U.S. Cl.
CPC .......................... *G06F 8/71* (2013.01)
(58) Field of Classification Search
USPC .......................................................... 717/120
See application file for complete search history.

(56) References Cited

U.S. PATENT DOCUMENTS

| 5,806,078 | A * | 9/1998 | Hug et al. ................... 715/205 |
| 6,275,223 | B1 | 8/2001 | Hughes |
| 6,848,078 | B1 | 1/2005 | Birsan et al. |
| 6,993,710 | B1 | 1/2006 | Coad et al. |
| 2002/0143522 | A1* | 10/2002 | Storisteanu et al. ............. 704/1 |
| 2002/0170048 | A1 | 11/2002 | Zgarba et al. |
| 2003/0023961 | A1* | 1/2003 | Barsness et al. ............. 717/152 |
| 2004/0210885 | A1* | 10/2004 | Wang et al. .................... 717/158 |
| 2005/0108686 | A1* | 5/2005 | White ........................... 717/124 |
| 2005/0120334 | A1 | 6/2005 | Deboer |
| 2005/0262488 | A1 | 11/2005 | Wagner et al. |

OTHER PUBLICATIONS

Thinkage (DIFF—compare source files, Internet article, URL: http://www.thinkage.ca/english/gcos/expl/diff.html; copyright (c) 2000, retrieved May 31, 2011).*
Sheppard (CMP.exe, Internet article, URL: http://web.archive.org/web/20030419072703/http://www.ss64.com/nt/comp.html; dated 2003, retrieved Aug. 12, 2011).*

* cited by examiner

*Primary Examiner* — Hang Pan
(74) *Attorney, Agent, or Firm* — Yee & Associates, P.C.; Lisa J. Ulrich (57) ABSTRACT

A Source Code Author Identifier (SCAI) automates the process of manually running a comparison to identify changes between versions of a source code file and associates identified changes with the author who made the change. After a developer identifies a segment of code in a first file, wherein the first file as a newer version of a second file, SCAI compares the segment of code in the first file to a corresponding segment of code in the second file. SCAI identifies the author of the first file whenever a difference is detected between the segment of code in the first file and the corresponding segment of code in the second file. SCAI displays the author of the first file next to the detected difference between the segment of code from the first file and the corresponding segment of code from the second file. SCAI can repeat the comparison across a plurality of versions of the file, comparing each version with the previously created version.

20 Claims, 5 Drawing Sheets

```
lines of code lines of code lines of code
code lines of code lines of code lines of code
of code lines of code lines of code lines of code If (!(siteCompany.getOrgId().equals(user.getOrgId())))
{
    //String usermsg = getMSK(resServlet Resource, "restrictedSite_error");   /710
    String usermsg = getMSK(resServlet Resource, "generic_error");   720
    EwmLogger.logSecurityViolation("The User: " + ewmUser.getIcrId() +
            " was trying to log in to a restricted site that was not his own.");
    throw new CompanySecurityException(usermsg);
} lines of code lines of code lines of code
code lines of code lines of code lines of code
of code lines of code lines of code lines of code
```

730 points to the commented-out line.

```
lines of code lines of code lines of code lines of
code lines of code lines of code lines of code lines
of code lines of code lines of code lines of code If (!(siteCompany.getOrgId().equals(user.getOrgId())))
{
    String usermsg = getMSK(resServlet Resource, "restrictedSite_error");   /710
    EwmLogger.logSecurityViolation("The User: " + ewmUser.getIcrId() +
            " was trying to log in to a restricted site that was not his own.");
    throw new CompanySecurityException(usermsg);
} lines of code lines of code lines of code lines of
code lines of code lines of code lines of code lines
of code lines of code lines of code lines of code
```

FIG. 8

IDENTIFYING AUTHORS OF CHANGES BETWEEN MULTIPLE VERSIONS OF A FILE

FIELD OF THE INVENTION

The present invention relates generally to managing software development and relates specifically to identifying authors of changes between multiple versions of a source code file.

BACKGROUND OF THE INVENTION

Multiple developers customarily collaborate when writing source code. When collaborating, different developers independently work on separate modules or portions of the source code file. Source code management systems facilitate the collaborative authoring process by different developers. In most source code management systems, developers check-out a file or module, make changes, and check the file or module back into the source code management system. The newly checked-in file or module is assigned a version number, and that version is associated with an author. In addition to tracking the version number and author as part of the source code management system, the file or module may have additional metadata containing version and author information.

While working on a portion of source code, a developer may have questions regarding code written or changed by another developer in an earlier version of the code. It may be beneficial for developers to be able to identify the individual who introduced, modified, or deleted a specific portion of code in the current or a previous version of the source code. Most source code management systems provide some level of version control that indicates dates, times, and the author responsible for creating or modifying a version. Some source code management systems track changes by line, some track by module, and some source code management systems do not track changes at all.

SVN (Subversion) and CVS (Concurrent. Versions System or "Cederqvist") are two commonly used source code management systems. SVN and CVS track changes to source code by line. Line-by-line tracking systems become cumbersome after multiple revisions, because the annotations include every prior revision. Further, these systems do not track the authors by segments or modules of the source code file. CMVC (Conversion Management Version Control) is a source code management system developed by IBM®. CMVC does not track versions by line, but rather tracks versions by module. CMVC assigns a version number to each new version of a module and associates the module version with the name of the developer who checks the module into the source code management system.

When a developer using CMVC needs to identify an author who made a specific change within a module, the developer manually executes a file comparison. For example, the developer may use the DIFF command to compare two versions of a module. DIFF compares the contents of two files, and the output is a line-by-line listing of the differences. The developer can determine who made changes to a specific version from the file information for that version. Depending on the file size, the DIFF output can be very extensive, and difficult to sort through. To find the instance where a specific line or code segment changes, developers may have to duplicate the comparison across multiple versions of the file. To compare multiple versions of a file, the developer must repeat the manual comparison for each version. Manual file comparisons using DIFF can be tedious and time consuming. Developers are prone to make errors when manually reviewing many lines of code, and especially when manually reviewing changes across multiple versions of the code.

A need exists for a way to automate file comparisons for a selected portion of code within a file across multiple versions of the file. A need further exists for an automated comparison to identify the file version where a change in the code occurred, and to associate the change to the author of the change. These and other objects of the invention will be apparent to those skilled in the art from the following detailed description of a preferred embodiment of the invention.

SUMMARY OF THE INVENTION

Source Code Author Identifier (SCAI) automates the process of manually comparing versions of a source code file to identify a change between the versions of a source code file and to associate the identified change with the author who made the change. After a developer identifies a segment of code in a first file, where the first file is a newer version of a second file, SCAI compares the segment of code in the first file to a corresponding segment of code in the second file. SCAI identifies the author of the first file whenever a difference is detected between the segment of code in the first file and the corresponding segment of code in the second file. SCAI displays the author of the first file next to the detected difference between the segment of code from the first file and the corresponding segment of code from the second file. SCAI repeats the comparison across a plurality of versions of the file, comparing each version with the previously created version.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes, without limitation, any useful combination of hardware and software, and a "computer program" or "program" includes, without limitation, any software operable to cause computer hardware to accept, perform logic operations on, store, or display data. A computer program may, and often is, comprised of a plurality of smaller programming units, including, without limitation, subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Source Code Author Identifier (SCAI).

Figure 1:
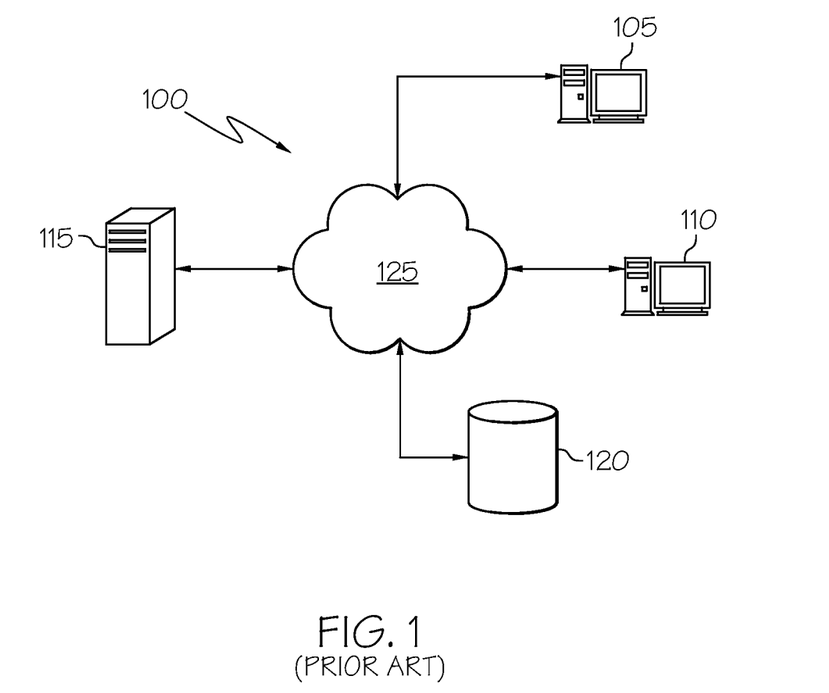
FIG. 1 is an exemplary computer network.

The SCAI is described below with reference to an exemplary network of hardware devices, as depicted in FIG. 1. A "network" comprises any number of hardware devices coupled to, and in communication with, each other through a communications medium, such as the Internet. A "communications medium" includes, without limitation, any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
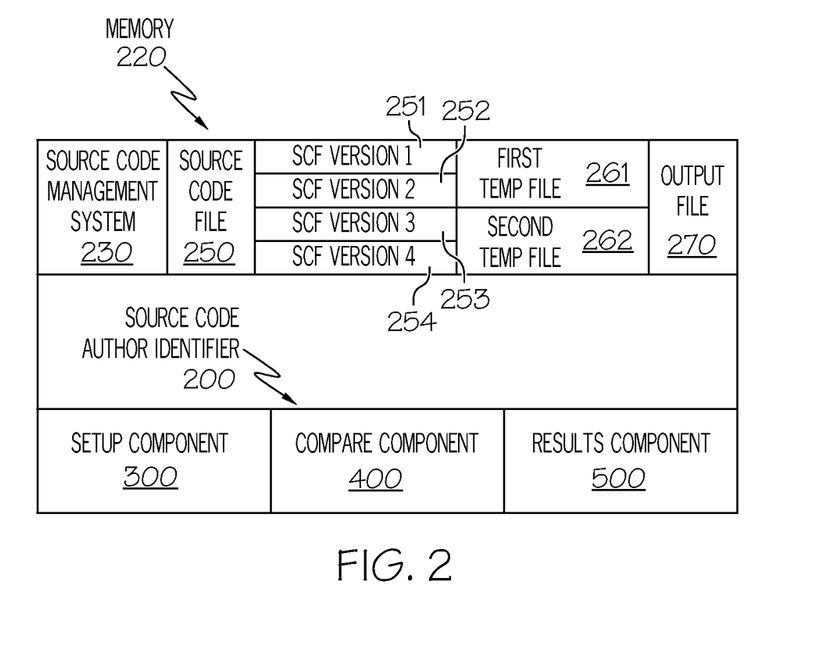
FIG. 2 describes programs and files in a memory on a computer.

SCAI 200 typically is stored in a memory, represented schematically as memory 220 in FIG. 2. The term "memory," as used herein, includes, without limitation, any volatile or persistent medium, such as a magnetic disk, or an optical disk, in which a computer can store data or software. A single memory may encompass, and be distributed across, a plurality of media. Further SCAI 200 may reside in more than one memory distributed across different computers, servers, logical partitions, or other hardware devices. The elements depicted in memory 220 may be located in or distributed across separate memories in any combination, and SCAI 200 may be adapted to identify, locate, and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to SCAI 200, memory 220 may include source code management system 230, source code file 250, first temporary (temp) file 261, second temp file 262, and output file 270 with which SCAI 200 interacts. Source code file (SCF) 250 includes, by way of example and not by way of limitation, multiple versions: SCF version 1 251, SCF version 2 252, SCF version 3, 253 and SCF version 4 254. Each subsequent version is newer than the last so that SCF version 4 254 is the most recent version, and SCF version 1 251 is the oldest or original version. SCAI 200 has three components: setup component 300, compare component 400, and output component 500.

Figure 3:
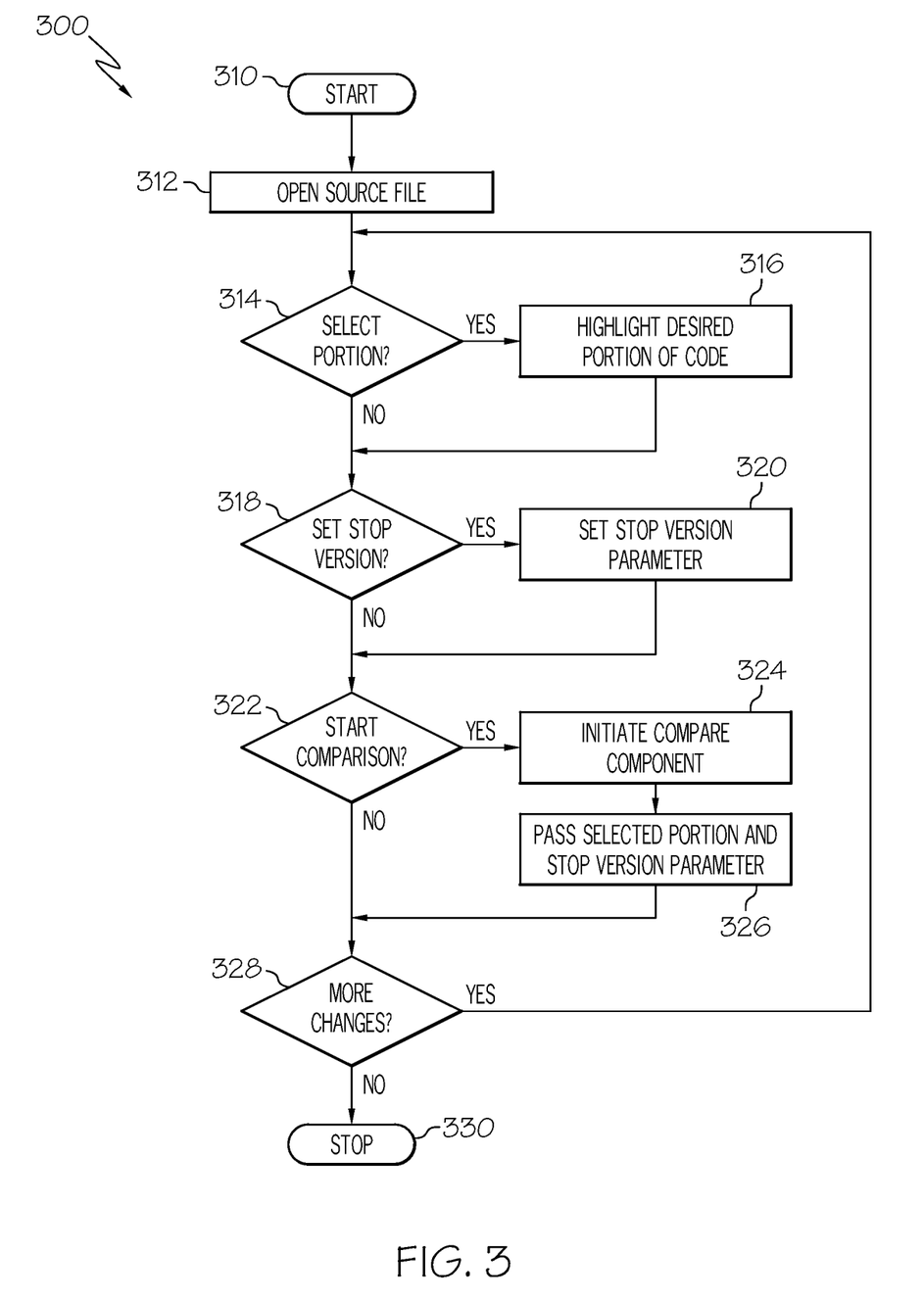
FIG. 3 is a flowchart of a setup component.

Setup component 300 starts when initiated by a developer using SCAI 200 (310) as shown in FIG. 3. Setup component 300 can be a standalone user interface, a plug-in, or may be otherwise integrated with a source code reader or editor as part of source code management system 230. Setup component 300 opens a user-selected version of source code file 250 (312). Usually, the latest version is selected. In the example, the latest version is SCF version 4 254. The developer may choose to select a portion of the code in SCF version 4 254 (314) for comparison with previous versions. If the developer chooses to select a portion of the code in SCF version 4 254, setup component 300 highlights, or otherwise marks the selected portion of the code (316). In one embodiment of setup component 300, the selected portion of code is marked with starting and ending line numbers. In another embodiment, setup component 300 uses other attributes such as routine names to indicate the selected portion of code. The developer may choose to set a stop version parameter (318), indicating the earliest version of source code file 250 that should be compared to identify changes. If the developer chooses to stop comparisons at a specified version, setup component 300 sets the stop version parameter (320), and if the developer does not choose to stop comparisons at a specified version, the stop version parameter defaults to the original version, which in the example is SCF version 1 251. The developer can choose when to start comparisons between versions (322) by selecting "GO" from a tool bar or menu. If the developer chooses to start comparisons, setup component 300 initiates compare component 400 (324). Setup component 300 passes the selected portion of code, if any, and passes the stop version parameter to compare component 400 (326). The developer may choose to make other changes (328) and repeat steps 314-326. Otherwise, the developer may choose to exit setup component 300, which then stops (330). In another embodiment of setup component 300, not shown here, developers can choose specific versions of source code file 250 to include in the comparisons rather than searching versions in sequence to a stopping point.

Figure 4:
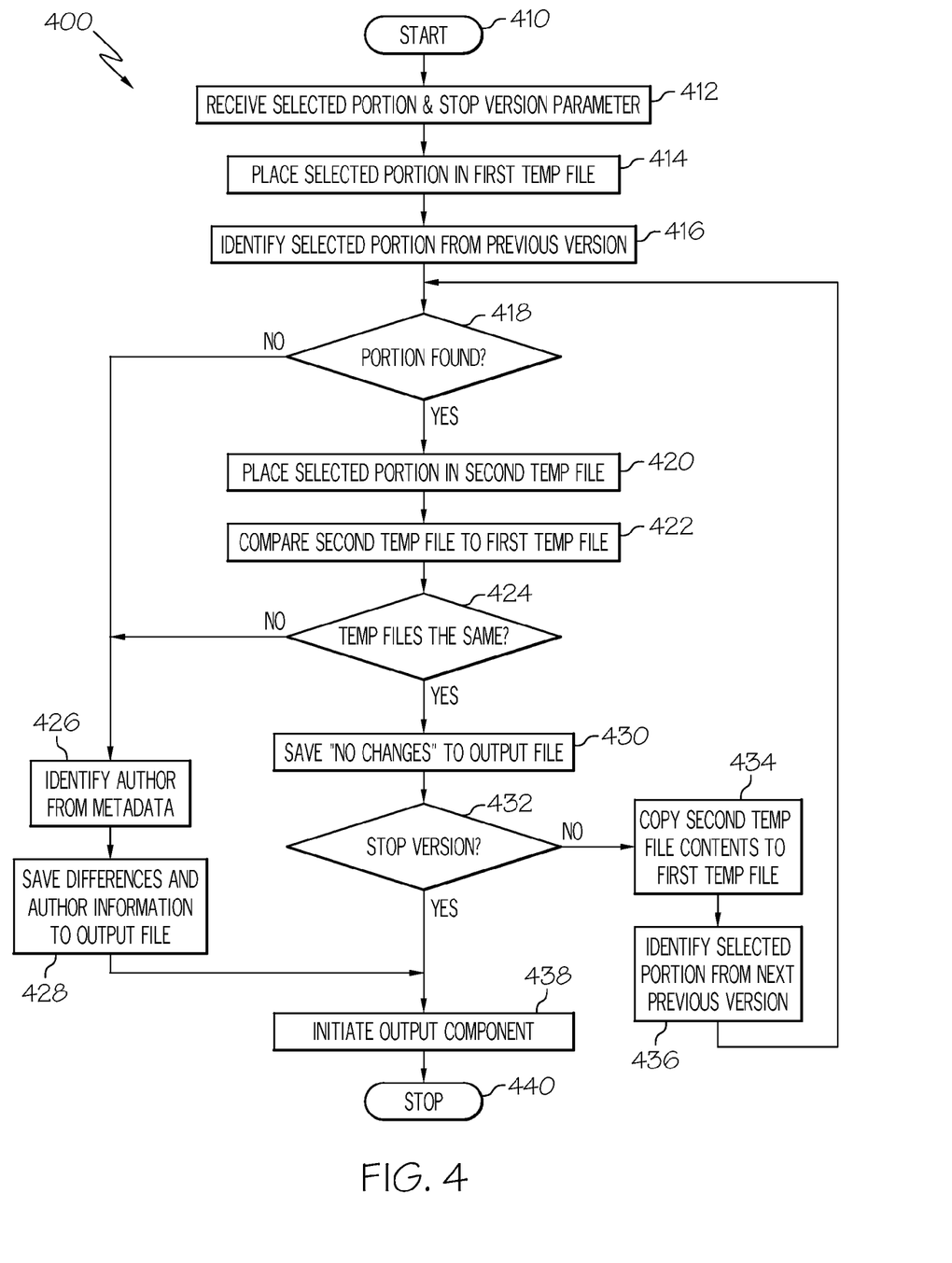
FIG. 4 is a flowchart of a compare component.

Referring to FIG. 4, Compare component 400 starts when initiated by setup component 300 (410). Compare component 400 receives the selected portion of code, if any, and the stop version parameter from setup component 300 (412). Compare component 400 identifies the corresponding selected portion of code in the previous version of source code file 250 (416) by matching line numbers, text markers, or routine names. If the corresponding selected portion of code is not found (418) in the previous version of source code at step 416, compare component 400 identifies the author of the current version as introducing the change (426). If the corresponding selected portion of code is found (418) in the previous version of source code at step 416, compare component 400 places a copy of the selected portion of code from the previous version in second temp file 262 (420). For example, if the current version of source code file 250 is SCF version 4 254, compare component 400 identifies the selected portion of code in SCF version 3 253 to place in second temp file 262. Compare component 400 compares the contents of second temp file 262 to first temp file 261 (422). Compare component 400 uses known art, such as a DIFF command, for comparing the contents of second temp file 262 to first temp file 261. The comparison will return a line-by-line listing of differences, if any. Based on the results from the comparison, compare component 400 determines if first temp file 261 and second temp file 262 are the same (424). If first temp file 261 and second temp file 262 are the same, compare component 400 saves a "no changes" message with the author's name and a version indicator to output file 270 (30). Compare component 400 determines if the last version of source code file 250 to be compared is the version identified by the stop version parameter (430). If the last version of source code file 250 compared is not the stop version, compare component 400 copies the contents of second temp file 262 to first temp file 261 (432). Compare component 400 identifies the selected code from the next previous version of source code file 250 (434), and repeats steps 418-430 until the stop version is compared. Once the stop version has been compared, compare component 400 initiates output component 500 (436) and stops (438). If at step 424 first temp file 261 and second temp file 262 are not the same, compare component 400 identifies the author of the newer version of source code file 250 from the metadata (426) and saves the returned line-by-line listing of differences with the author's name and a version indicator to output file 270 (428). Compare component 400 initiates output component 500 (436) and stops (438).

Figure 5:
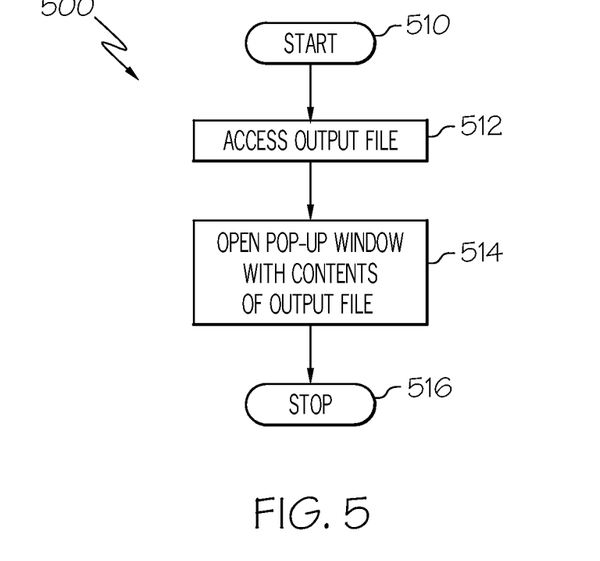
FIG. 5 is a flowchart of a results component.

Output component 500 starts when initiated by compare component 400, as shown in FIG. 5. Output component 500 accesses output file 270 (512), displays the contents of output file 270 in a pop-up window (514) and stops (516). Other embodiments of output component 500 include a means to view the contents of output file 270 with the corresponding portion of code in the current version of source code file 250, or a means to save or print the contents of output file 270.

Figure 6:
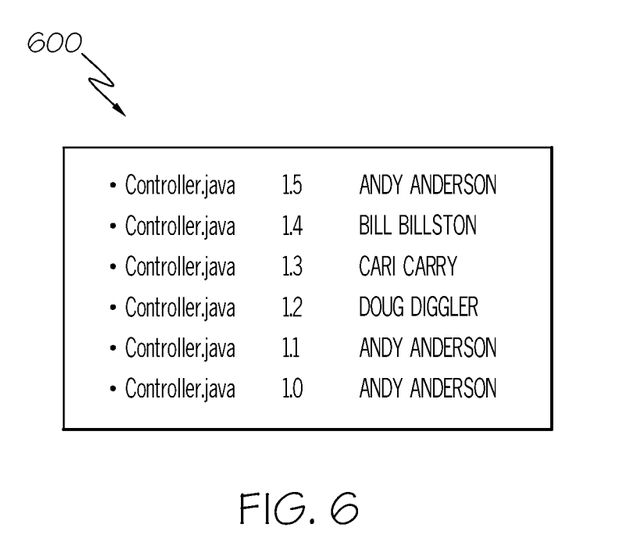
FIG. 6 is a listing of source code file versions and authors.
Figure 7:
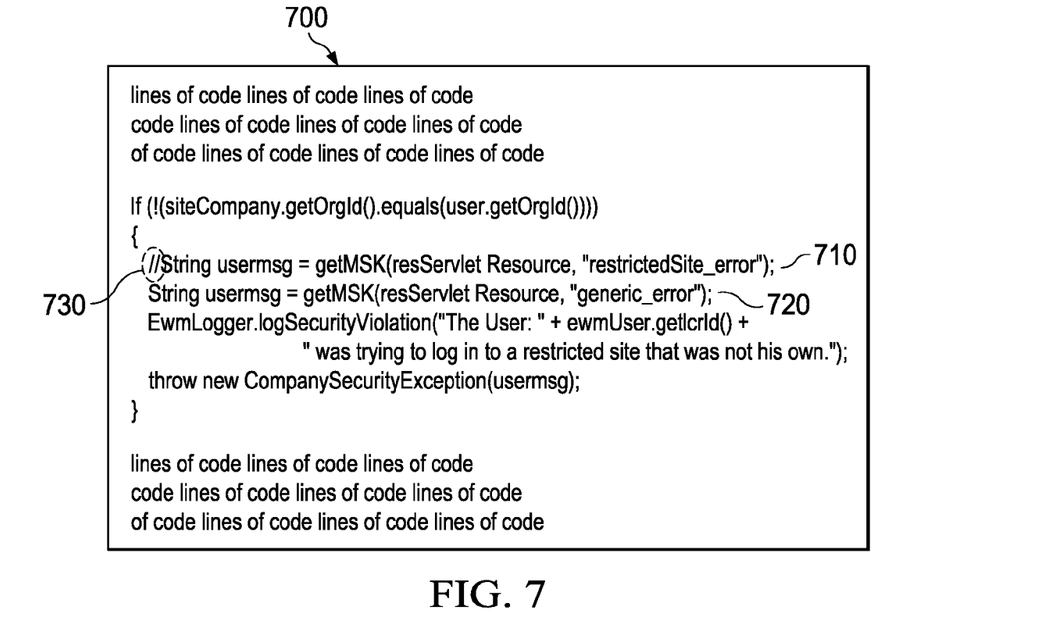
FIG. 7 is a sample segment of source code from a current version.
Figure 8:
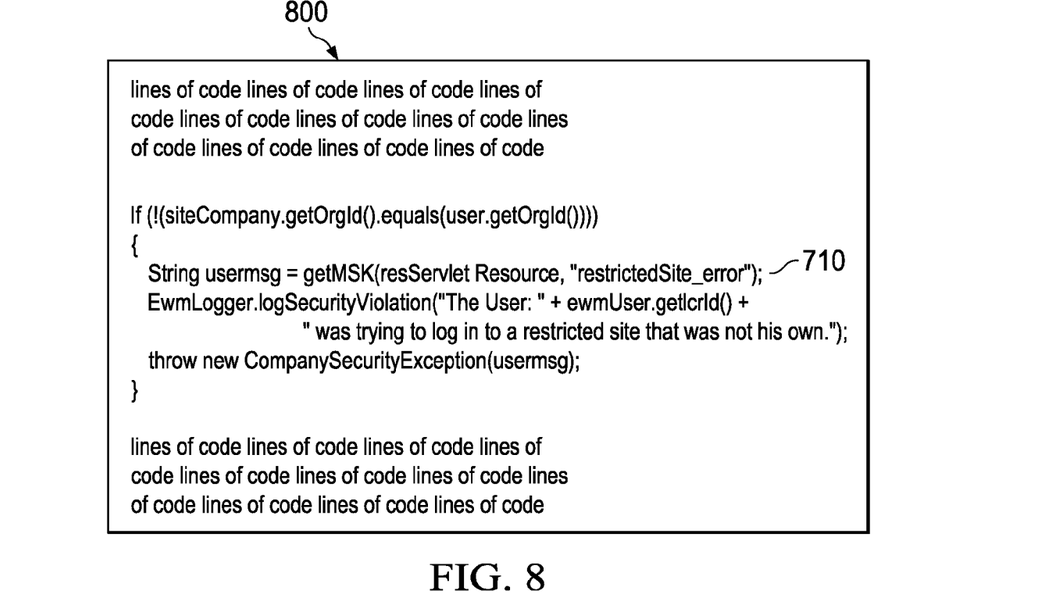
FIG. 8 is a sample segment of source code from a previous version.

An example CMVC module listing is displayed in FIG. 6 as version listing 600. Version listing 600 shows six versions of the source code file Controller.java, with the version numbers and the respective author for each version. Segment of code 700 in the current version of Controller.java (version 1.5) is shown by FIG. 7. Andy Anderson (Andy), the author of version 1.5, notices that line 710 containing a detailed error message "restrictedSite_error" has been commented out of the code with symbols 730. A presumably new line of code 720 follows, containing a less detailed "generic_error" error message. Andy is curious why the detailed error message was replaced by a generic error message. Andy runs SCAI 200, which compares the segment of source code to previous versions of Controller.java. Since Andy created version 1.0 and version 1.1 of Controller.java with the detailed error message, Andy sets a parameter indicating that the comparisons should stop at version 1.1. SCAI 200 identifies a difference in the code in Controller.java version 1.2 as shown in FIG. 8. Segment of code 800 contains original line of code 710, but does not contain new line of code 720 or symbols 730. SCAI 200 identifies that new line of code 720 first appears in Controller.java version 1.3, and determines that the author of version 1.3 is Cari Carry (Cari) from version listing 600. Andy can now contact Cari to determine why the code was changed.

A preferred form of the invention has been shown in the drawings and described above, but variations in the preferred form will be apparent to those skilled in the art. Specifically, SCAI 200 can be adapted for use by any database or file logging systems that tracks multiple versions of a table or file. The preceding description is for illustration purposes only, and the invention should not be construed as limited to the specific form shown and described. The scope of the invention should be limited only by the language of the following claims.

What is claimed is:

1. A process for identifying an author of a source code modification, the process comprising the steps of:
  a computer indicating a selected segment of code and syntax in a first version of a source code file, wherein the first version is a newer version of the source code file than a second version of the source code file, and wherein the selected segment of code and syntax in the first version of the source code file is identified using one of highlighting, marking using a start line number at a start of the selected segment and an end line number at the end of the selected segment, marking using a particular text marker, and using an attribute including a routine name;
  the computer comparing the selected segment of code and syntax in the first version to a corresponding segment of code and syntax in the second version, wherein the corresponding segment of code and syntax in the second version is identified by matching one of text highlighted, the start line number and the end line number, the particular text marker or the routine name;
  responsive to the computer detecting a difference between the selected segment of code and syntax in the first version and the corresponding segment of code and syntax in the second version, the computer generating an output file by extracting a metadata entry associated with the first version, wherein the metadata entry associated with the first version indicates the author of the source code modification, and wherein a line-by-line listing of differences including the source code modification and a version indicator of the source code modification are included in the difference;
  the computer displaying the output file, wherein the metadata entry from the first version, including an author name and the version indicator are displayed adjacent to each detected difference between the selected segment of code and syntax from the first version and the corresponding segment of code and syntax from the second version; and
  responsive to the computer detecting that there are no differences between two versions of the source code file, the computer generating another output file, containing a no change message that reflects that there are no changes in a newer one of the two versions to an older one of the two versions, the no change message identifying only an author name of the newer one of the two versions and including the version indicator of the newer one of the two versions.

2. The process of claim 1 further comprising:
  the computer repeating the indicating, the comparing, the extracting, and the displaying steps of claim 1 for each version of a plurality of versions of the source code file.

3. The process of claim 2 further comprising:
  the computer setting a parameter indicating the version indicator of an earliest version of the plurality of versions to use as the second version in a comparing step.

4. The process of claim 3 further comprising:
  the computer stopping the repeating with the version indicator of the earliest version of the plurality of versions indicated by the parameter.

5. The process of claim 1 wherein the comparing step comprises the computer executing a DIFF command.

6. The process of claim 1 wherein the selected segment of code in the first version is identified by the start line number at the start of the selected segment and the end line number at the end of the selected segment.

7. The process of claim 1 wherein the first version comprises a source code module created with a Conversion Management Version Control (CMVC) source code management system.

8. An apparatus for identifying an author of a source code modification, the apparatus comprising:
  a processor;
  a computer memory connected to the processor;
  instructions, stored in the computer memory for execution by the processor, to indicate a selected segment of code and syntax in first version of a source code file, wherein the first version is a newer version of the source code file than a second version of the source code file, and wherein the selected segment of code and syntax in the first version of the source code file is identified using one of highlighting, marking using a start line number at a start of the selected segment and an end line number at the end of the selected segment, marking using a particular text marker, and using an attribute including a routine name;

instructions, stored in the computer memory for execution by the processor, to compare the selected segment of code and syntax in the first version to a corresponding segment of code and syntax in the second version, wherein the corresponding segment of code and syntax in the second version is identified by matching one of text highlighted, the start line number and the end line number, the particular text marker or the routine name;

instructions, stored in the computer memory for execution by the processor, to, responsive to detecting a difference between the selected segment of code and syntax in the first version and the corresponding segment of code and syntax in the second version, generate an output file by extracting a metadata entry associated with the first version, wherein the metadata entry associated with the first version indicates the author of the source code modification, and wherein a line-by-line listing of differences including the source code modification and a version indicator of the source code modification are included in the difference;

instructions, stored in the computer memory for execution by the processor, to display the output file, wherein the metadata entry from the first version including an author name and the version indicator are displayed adjacent to each detected difference between the selected segment of code and syntax from the first version and the corresponding segment of code and syntax from the second version; and instructions, stored in the computer memory for execution by the processor, to, responsive to detecting that there are no differences between two versions of the source code file, generate in another output file, a no change message that reflects that there are no changes in a newer one of the two versions to an older one of the two versions, the no change message only identifying an author of the newer one of the two versions and including a version indicator of the newer one of the two versions.

9. The apparatus of claim 8 further comprising:
instructions, stored in the computer memory for execution by the processor, to repeat the instructions to indicate, the instructions to compare, the instructions to extract, and the instructions to display for each version of a plurality of versions of the source code file.

10. The apparatus of claim 9 further comprising:
instructions, stored in the computer memory for execution by the processor, to set a parameter indicating the version indicator of an earliest version of the plurality of versions to use as the second version in the instructions to compare.

11. The apparatus of claim 10 further comprising:
instructions, stored in the computer memory for execution by the processor, to stop repeating the instructions to indicate, the instructions to compare, the instructions to extract, and the instructions to display with the version indicator of the earliest version of the plurality of versions indicated by the parameter.

12. The apparatus of claim 8 wherein the instructions to compare execute a DIFF command.

13. The apparatus of claim 8 wherein the segment of code in the first version of the source code file is identified by the start line number at the start of the selected segment and the end line number at the end of the selected segment.

14. A computer readable memory having stored thereon a plurality of instructions executable by a processor to identify an author of a source code modification, the plurality of instructions comprising:

instructions to indicate, by the processor, a selected segment of code and syntax in a first version of a source code file, wherein the first version is a newer version of the source code file than a second version of the source code file, and wherein the selected segment of the source code and syntax in the first version of the source code file is identified using one of highlighting, marking using a start line number at a start of the selected segment and an end line number at the end of the selected segment, marking using a particular text marker, and using an attribute including a routine name;

instructions to compare, by the processor, the selected segment of code and syntax in the first version to a corresponding segment of code and syntax in the second version, wherein the corresponding segment of code and syntax in the second version is identified by matching one of text highlighted, the start line number and the end line number, the particular text marker or the routine name;

instructions to, in response to detecting a difference between the selected segment of code and syntax in the first version, generate an output file by extracting, by the processor, a metadata entry associated with the first version, wherein the metadata entry associated with the first version indicates the author of the source code modification, and wherein a line-by-line listing of differences including the source code modification and a version indicator of the source code modification are included in the difference;

instructions to display, by the processor, the output file, wherein the metadata entry from the first version including an author name and the version indicator are displayed adjacent to each detected difference between the selected segment of code and syntax from the first version and the corresponding segment of code and syntax from the second version; and instructions to, responsive to detecting that there are no differences between two versions of the source code file, generate, in another output file, a no change message that reflects that there are no changes in a newer one of the two versions to an older one of the two versions, the no change message identifying only an author of the newer one of the two versions and including a version indicator of the newer one of the two versions.

15. The computer readable memory of claim 14 wherein the plurality of instructions further comprise:
instructions to repeat the instructions to indicate, the instructions to compare, the instructions to extract, and the instructions to display for each version of a plurality of versions of the source code file.

16. The computer readable memory of claim 15 wherein the plurality of instructions further comprise:
instructions to repeat the instructions to set a parameter indicating the version indicator of an earliest version of the plurality of versions to use as the second version in the instructions to compare.

17. The computer readable memory of claim 16 wherein the plurality of instructions further comprise:
instructions to stop repeating the instructions to indicate, the instructions to compare, the instructions to extract, and the instructions to display with the version indicator of the earliest of the plurality of versions indicated by the parameter.

18. The computer readable memory of claim 14 wherein the instructions to compare execute a DIFF command.

19. The computer readable memory of claim 14 wherein the selected segment of code in the first version is identified by the start line number at the start of the selected segment and the end line number at the end of the selected segment.

20. The computer readable memory of claim 14 wherein the first version comprises a source code module created with a Conversion Management Version Control (CMVC) source code management system.

\* \* \* \* \*